C. WIELAND.
TIRE REPAIR TOOL.
APPLICATION FILED DEC. 16, 1919.
1,344,838.
Patented June 29, 1920.
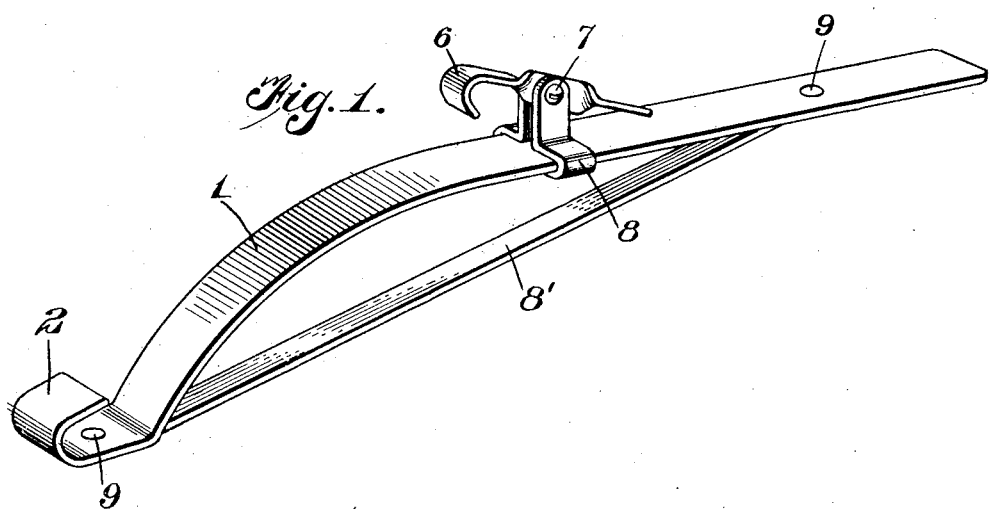
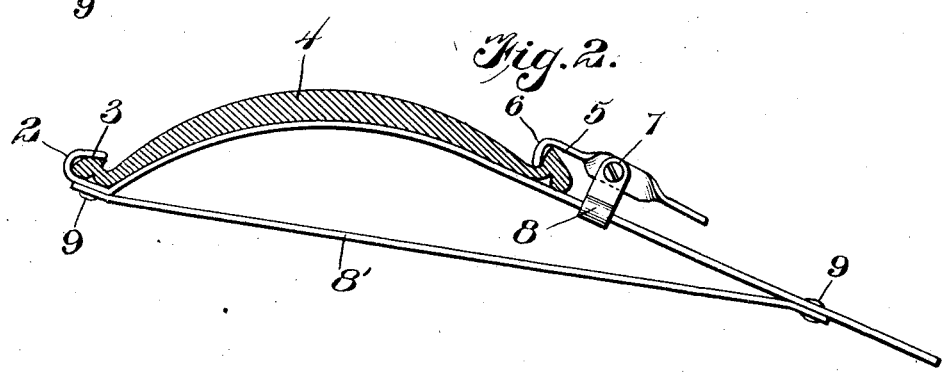
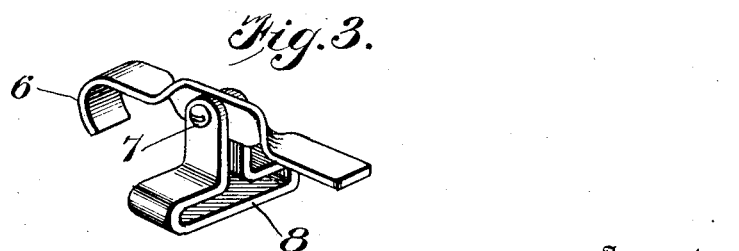
Inventor
Charles Wieland
By Spear Middleton Donaldson & Hall
Attorney

UNITED STATES PATENT OFFICE.

CHARLES WIELAND, OF YANKTON, SOUTH DAKOTA.

TIRE-REPAIR TOOL.

1,344,838.  Specification of Letters Patent.  Patented June 29, 1920.

Application filed December 16, 1919. Serial No. 345,394.

*To all whom it may concern:*

Be it known that I, CHARLES WIELAND, a citizen of the United States, and a resident of the city of Yankton, State of South Dakota, have invented certain new and useful Improvements in Tire-Repair Tools, of which the following is a specification.

My invention relates to repair tools for pneumatic tires and more particularly to the class that are used for spreading and holding apart of a pneumatic tire casing to facilitate the inspection and repair thereof.

This invention is an improvement on the device disclosed in U. S. Patent 1,288,340, granted to me under date of Dec. 17, 1918, its principal object being to provide a much stronger and more efficient repair tool than that shown in my prior patent, and it consists in the novel construction, combination of parts and details hereinafter described.

In the drawings:—

Figure 1 is a perspective view of my improved repair tool.

Fig. 2 is a transverse sectional view of a pneumatic tire casing with my repair tool applied thereto.

Fig. 3 is a detail showing the slidable hook which engages the flange of the tire casing.

1 indicates a longitudinal curved metal bar having a hooked end 2 adapted to engage one flange 3 of a pneumatic tire casing 4. The opposite end of the bar 1 is approximately straight and constitutes a handle for operating the tool. The upper or hooked side of the bar 1 is flat and is adapted to bear against the outerside of the tire casing when the tool is placed transversely of the casing. The other flange 5 of the casing 4 is engaged by a hook 6 pivoted intermediate of its length as at 7 to a member 8 slidably mounted on the bar 1. That part of the hook 6 which lies behind the pivot 7 acts as a trigger by which the hook is readily released from the tire.

I have found that by constant use on stiff casings there is a tendency for the bar to straighten and thus become useless, and as an absolute remedy for this I provide a metal brace 8 relatively shorter than the bar 1 having its ends secured as by rivets 9 to the under side of the bar and extending from the hooked end 2 to a point beyond the curve. Thus it will be seen that any strain on the curve of the bar will be taken up by the brace 8.

What I claim is:

1. A tire repair tool of the class described comprising a longitudinal curved bar having a hook at one end on its convex side adapted to engage one flange of a tire casing, a handle portion, means slidably mounted on the bar for engaging the opposite flange of the casing when the tool is placed transversely thereof and a brace extending beneath the curved part of the bar.

2. A tire repair tool of the class described comprising a longitudinal curved bar having a hook at one end on its convex side adapted to engage one flange of a tire casing, a handle portion, a pivoted hook slidably mounted on the bar for engaging the opposite flange of the casing when the tool is placed transversely thereof and a brace extending beneath the curved part of the bar.

In testimony whereof I affix my signature.

CHARLES WIELAND.